Patented Feb. 8, 1944

2,341,455

UNITED STATES PATENT OFFICE 2,341,455

METHOD OF STABILIZING CELLULOSE ETHERS

Carl J. Malm and Carlton L. Crane, Rochester, N. Y., assignors to Eastman Kodak Company, Rochester, N. Y., a corporation of New Jersey No Drawing. Application September 11, 1941, Serial No. 410,432

2 Claims. (Cl. 260—232)

This invention relates to the stabilization of cellulose ethers by a process which involves kneading or mixing the cellulose ether in a mixture of an inert water-miscible organic solvent and water while maintaining the pH of the liquid between 3 and 8.

It has been previously recognized that whereas the commercially available cellulose ethers may be sufficiently stable for the preparation of films or foils, they cannot withstand temperatures at which they are softened. Although various methods of stabilizing cellulose ethers to make them resistant to thermal decomposition have been suggested, such as treating them with hydrogen under pressure in the presence of a hydrogenation catalyst, none of these methods appear to have been successful as no cellulose ether is known to be marketed which resists softening temperatures. Many of the commercial cellulose ethers available at the present time decompose in a short time at 180° C. and also have a low char point.

One object of our invention is to provide a method of stabilizing cellulose ethers at normal temperatures. Another object of our invention is to provide a method of stabilizing cellulose ethers in which the resulting product is in a readily useable physical form. Other objects of our invention will appear herein.

We have found that a cellulose ether may be easily stabilized by kneading or mixing it with water and an inert water-miscible solvent while maintaining at a pH between 3 and 8. The resulting product has excellent stability as indicated by a high char point and resistance to decomposition at softening temperatures. We have found that this method of stabilizing cellulose ethers is applicable both to alkyl celluloses and to cellulose ethers containing cyclic groups such as benzyl cellulose. Although our invention is applicable to cellulose ethers generally it is particularly applicable to ethyl celluloses having an ethoxy content between 45 and 50%. We have in addition found that the cellulose ethers treated by our process usually have a lowered melting point.

In the preparation of cellulose ethers commercially, sodium hydroxide and alkyl chloride are usually employed. During the washing of the ethers the last part of the alkali is often neutralized by the addition of a strong mineral acid such as sulfuric or hydrochloric. In the case of the water-resistant cellulose ethers, it is difficult to carry out this neutralization to a point where the pH is uniform throughout the ether. The aggregate pH of those ethers is usually below 3 and therefore to stabilize those ethers it is desirable to employ a pH of 7–8.5 and preferably 7–7.5 in at least the first part of the stabilization. If a cellulose ether which has not been subjected to a neutralization is to be stabilized it is desirable to employ a pH of between 3 and 7 in at least the first portion of the stabilization treatment so as to obtain a constant pH near to 7 in the last part of the stabilization treatment.

If a cellulose ether which has an aggregate pH within the range given, particularly when near 7 is to be stabilized it is ordinarily unnecessary to add any agent for adjusting the pH, the stabilization of the cellulose ether being accomplished by kneading it in the mixture of water and solvent.

Ordinarily the system of our stabilization process is two-phase, the cellulose ether being in the form of a doughy mass which is worked in the liquid. When a cellulose ether having a high pH value is mixed in an aqueous solvent other than aqueous dioxan, the initial mixture shows itself to be an emulsion rather than a two-phase system. As the pH is lowered the emulsion breaks forming the usual two-phase system.

In stabilizing cellulose ethers in accordance with our invention, the only requisite of the organic solvent which is used is that it is inert, water-miscible and when mixed with water forms a dough-liquid mass with the cellulose ether, except for the case noted above in which a cellulose ether having a high initial pH is used. The most suitable solvents which exhibit these properties are dioxan, methyl ethyl ketone, and tertiary amyl alcohol. There are, of course, several other solvents which can be used, the requirements being that they are water soluble and have a softening effect upon the cellulose ether.

For the agents to adjust the pH, materials such as magnesium carbonate, sodium carbonate or acid carbonate, urea or ammonia or in fact any alkaline materials of this nature which are not so strongly alkaline that they have a pronounced or substantial decomposing effect on the cellulose ether may be employed. With extreme care, it is possible to use strongly alkaline materials such as sodium hydroxide. For the acid pH adjusting agents, any of the common acids may be employed providing it has no substantial effect on the cellulose ether. Although phosphoric acid is considered preferable for this purpose, various other acid materials such as acetic acid, phthalic acid, sulfuric acid and hydrochloric acid have been employed to good effect. In the case of strong acids such as sulfuric and hydrochloric it is preferred that the pH of the liquids be as near to 7 as possible to get the best results.

In its broadest aspects, our invention comprises a stabilization process in which a washed cellulose ether is mixed or kneaded with water and an inert water-miscible organic solvent which in usual practice forms a two phase dough-liquid mass. The water may be the result of the direct use of a cellulose ether as it comes from the washing steps without drying or it may be added such as where a dry ether is employed or where a wet ether is used which does not supply sufficient water to the mass. After thorough mixing or kneading such as by the use of a vessel having a mixing or kneading apparatus therein, a small amount of neutralizing agent is added to the liquid if this is necessary to adjust the pH to that desired. The mixing or kneading is continued and samples of the liquid are taken at intervals and tested for pH, such as every 15 minutes, to determine whether or not neutralizing agent is needed. The mixing or kneading is continued until the pH becomes constant as shown by the same pH in 2 successive tests.

Thereupon the liquid present is separated from the doughy mass such as by decantation. If desired the dough may be filtered by forcing it through a fine mesh screen or it may be directly worked up particularly if the solvent already present is to be employed in making products therefrom. Instead of this the cellulose ether may be isolated by the addition of water. This extracts solvent from the dough, causing it to harden and break into small pieces. By boiling to drive off the residual solvent and drying, the cellulose ether is obtained in a form sufficiently brittle that it can be readily powdered by milling.

The following examples illustrate the stabilization of cellulose ethers in accordance with this invention:

Example I 1.2 lbs. of ethyl cellulose of 49.4% ethoxyl content and 4.9 lbs. of a water solution of dioxan of 82.3% concentration were placed in a Werner-Pfleiderer type mixer and mixed or kneaded at 100° F. until a smooth plastic mass was obtained. Acetic acid was then added in sufficient amount to impart a pH of 7.2 to the supernatant liquid and mixing or kneading was continued with pH readings at intervals and if necessary additions of acid to bring the pH back to 7.2.

The mixing or kneading was continued until the pH became constant as shown by two successive readings. The liquid was then thoroughly drained from the plastic mass. Fresh portions of distilled water were added to the material in the mixer 5 times at intervals of one-half hour each, with mixing or kneading of the material with the water. The material was thoroughly drained and dried.

The properties of the stabilized cellulose ether compared with the original material as follows:

|  | Melt point | Char point | Heated 8 hrs. at 180° C. |
|---|---|---|---|
|  | °C. | °C. |  |
| Original | 185 | 245 | Brown char in 2 hrs. |
| Stabilized | 158 | 310 | Light yellow melt. |

Example II 1.2 lbs. of ethyl cellulose (49.4% ethoxyl) and 4.8 lbs. of a water solution of dioxan of 81.3% concentration were placed in a Werner-Pfleiderer type mixer and mixed or kneaded at 100° F. until a smooth plastic was obtained. Phthalic anhydrides was then dissolved in the supernatant liquid to impart a pH of 6.9 thereto. The mass was then mixed or kneaded with pH readings of the supernatant liquid at intervals and if necessary addition of acid to bring the pH back to 6.9. When the pH value was constant without further adjustment, the liquid was thoroughly drained from the plastic mass. Fresh portions of distilled water were added to the mixer 3 times at one-half hour intervals, the water and plastic being thoroughly mixed together each time. The product was then thoroughly drained and dried.

The properties of the stabilized cellulose ether compared with the original material are as follows:

|  | Melt point | Char point | Heated 8 hrs. at 180° C. |
|---|---|---|---|
|  | °C. | °C. |  |
| Original | 184 | 275 | Char in 2 hrs. |
| Stabilized material | 149 | 302 | Light yellow melt. |

Example III 6.5 lbs. of a cellulose ether (49.5% ethoxyl) and 36.5 lbs. of a water solution of dioxan (81.3% conc.) were placed in a Werner-Pfleiderer type mixer and mixed or kneaded at 100° F. until a smooth plastic mass was obtained. A pH value of 7.1 was imparted to the supernatant liquid with magnesium carbonate and the mixing or kneading was continued. This mixing was continued until the pH value was constant at 7.1 without further adjustment. The supernatant liquid was drained from the mass and the material was washed by mixing in 3 one-half hour changes of distilled water. After drying its properties were compared with those of the original material:

|  | Melt point | Char point | 8 hours at 180° C. heat test |
|---|---|---|---|
|  | °C. | °C. |  |
| Original material | 135 | 178 | Black in one hr. |
| Stabilized material | 134 | 317 | Very light yellow melt. |

Example IV 0.7 lb. of ethyl cellulose (49.6% ethoxyl) and 2.1 lbs. of a 38% mixture of tertiary amyl alcohol and distilled water were placed in a Werner-Pfleiderer type mixer and were mixed or kneaded at 100° F. until a smooth emulsion was obtained. The pH was adjusted to 6.9 by the addition of acetic acid. As this pH was approached the emulsion broke forming a two-phase system composed of a plastic mass and a clear, brilliant liquid. The mass was mixed or kneaded until the pH value was constant at 6.9 without further adjustment. The supernatant liquid was drained off and the cellulose ether material was washed by mixing in 4 one-half hour changes of distilled water, drained thoroughly and dried.

|  | Melt point | Char point | 8 hour sat 180° C. heat test |
|---|---|---|---|
|  | °C. | °C. |  |
| Original material | 184 | 275 | Dark brown in 2 hrs. |
| Treated material | 151 | 298 | Light yellow melt. |

Example V 1.4 lbs. of ethyl cellulose (49.3% ethoxyl) and 4.2 lbs. of a water solution of methyl ethyl ketone (28.6% conc.) were placed in a Werner-Pfleiderer type mixer and were mixed or kneaded until a smooth emulsion resulted. The pH was adjusted to 5.1 with a 1:1 mixture of distilled water—95% sulfuric acid. When the pH approached the acid side, the emulsion was broken and a two-phase system resulted. The mass was mixed or kneaded until the pH value was constant without further adjustment. The liquid was drained from the mixer and the cellulose ether material was washed by mixing in three one-half hour changes of distilled water. The product was thoroughly drained and dried. The following table compares the properties of the material before and after stabilization:

|  | Melt point | Char point | 180° C. heat test |
|---|---|---|---|
|  | °C. | °C. |  |
| Original material | 158 | 275 | Black in 8 hours. |
| Stabilized material | 161 | 297 | Light yellow melt. |

*Example VI*

1.4 lbs. of ethyl cellulose (49.3% ethoxyl) and 4.2 lbs. of a water solution of methyl ethyl ketone (28.6% conc.) were placed in a Werner-Pfleiderer type mixer and were mixed until a smooth emulsion was obtained. The pH of the mass was adjusted to 4.3 with concentrated hydrochloric acid. As the pH neared the acid side, the emulsion broke giving a two-phase system. The mass was mixed or kneaded until the pH value of the supernatant liquid was constant. The supernatant liquid was then drained from the mixer and the material was washed by mixing in three one-half hour changes of distilled water. The product was then thoroughly drained and dried. The following table compares the properties of the material before and after stabilization:

|  | Melt point | Char point | 180° C. heat test |
|---|---|---|---|
|  | °C. | °C. |  |
| Original material | 158 | 275 | Black in 8 hours. |
| Stabilized material | 157 | 290 | Light brown. |

*Example VII*

1.1 lbs. of ethyl cellulose (49.3% ethoxyl) and 3.3 lbs. of a water solution of methyl ethyl ketone (40% conc.) were mixed together until a smooth emulsion was obtained. The pH was adjusted to 3.1 with 85% phosphoric acid. The mass was mixed or kneaded until the pH was constant at this point, whereupon the supernatant liquid was drained from the mixer. The material was washed by mixing in three one-half hour changes of distilled water. The product was thoroughly drained and dried and the properties, compared with those of the original material, were found to be as follows:

|  | Melt point | Char point | 180° C. heat test |
|---|---|---|---|
|  | °C. | °C. |  |
| Original material | 158 | 275 | Black in 8 hours. |
| Stabilized material | 156 | 304 | Light yellow melt. |

*Example VIII*

1.3 lbs. of commercial grade benzyl cellulose and 4 lbs. of a water solution of methyl ethyl ketone (40%) were placed in a Werner-Pfleiderer type mixer until a smooth plastic mass was obtained. The cellulose ether employed here showed a pH on the acid side. The pH value of the supernatant liquid was adjusted to 7.2 with magnesium carbonate. The mass was mixed or kneaded until the pH value was constant, whereupon the supernatant liquid was drained from the mixer. The material in the mixer was extracted by mixing for one hour with 4 lbs. of a 25% mixture of methyl ethyl ketone and distilled water. This liquid was then drained therefrom. The extraction was repeated with 3.2 lbs. of a 22% mixture of methyl ethyl ketone and distilled water. The material was drained thoroughly and washed by mixing in three one-half hour changes of distilled water. The following table compares the properties of the material before and after stabilization.

|  | Melt point | Char point |
|---|---|---|
|  | °C. | °C. |
| Original material | 130 | 260 |
| Stabilized material | 126 | 298 |

Lapses in the prescribed pH in our process prolong the stabilizing process and therefore the term "maintaining" is used herein in the sense that generally during the treatment the pH will be that prescribed.

We claim:

1. A method of stabilizing an ethyl cellulose which comprises mixing it with methyl ethyl ketone containing sufficient water to prevent dissolving of the cellulose ether therein until a smooth plastic mass is obtained, then adding acetic acid thereto to impart a pH of approximately 7 and continuing the mixing while maintaining the mass at this pH until a constant pH of the liquid mixture is attained.

2. A method of stabilizing a cellulose ether which comprises mixing it with methyl ethyl ketone containing sufficient water to prevent dissolving of the cellulose ether therein until a smooth plastic mass is obtained, then adding an acid selected from the group consisting of acetic, phosphoric, phthalic, sulfuric and hydrochloric thereto to impart a pH of approximately 7 and continuing the mixing while maintaining the mass at this pH until a constant pH of the liquid mixture is obtained.

CARL J. MALM.
CARLTON L. CRANE.